(12) United States Patent
Kammerer et al.

(10) Patent No.: US 8,528,709 B2
(45) Date of Patent: Sep. 10, 2013

(54) HYDRODYNAMIC MACHINE, ESPECIALLY HYDRODYNAMIC RETARDER

(75) Inventors: Steffen Kammerer, Crailsheim (DE); Rainer Schips, Ellwangen (DE)

(73) Assignee: Voith Patent GmbH, Heidenheim (DE)

( * ) Notice: Subject to any disclaimer, the term of this patent is extended or adjusted under 35 U.S.C. 154(b) by 309 days.

(21) Appl. No.: 12/931,013

(22) Filed: Jan. 21, 2011

(65) Prior Publication Data

US 2011/0220442 A1 Sep. 15, 2011

(30) Foreign Application Priority Data

Jan. 29, 2010 (DE) .......................... 10 2010 006 333

(51) Int. Cl.
*F16D 57/02* (2006.01)
(52) U.S. Cl.
USPC .......................................... 188/292; 188/294
(58) Field of Classification Search
USPC .................. 188/290–296; 60/343, 347, 361; 192/3.3
See application file for complete search history.

(56) References Cited

U.S. PATENT DOCUMENTS

| | | | | |
|---|---|---|---|---|
| 4,744,443 A | * | 5/1988 | Brosius | ........................... 188/292 |
| 5,147,181 A | * | 9/1992 | Klemen | ..................... 416/223 R |

FOREIGN PATENT DOCUMENTS

| | | |
|---|---|---|
| DE | 1 075 384 | 2/1960 |
| DE | 1 475 389 | 6/1969 |
| DE | 1 475 510 | 6/1969 |
| DE | 2 239 562 | 2/1974 |
| DE | 31 13 408 | 10/1982 |
| DE | 87 14 859 | 1/1988 |
| DE | 38 11 246 | 10/1989 |
| DE | 44 46 287 | 6/1995 |
| DE | 195 44 190 | 8/1996 |

* cited by examiner

*Primary Examiner* — Christopher Schwartz
(74) *Attorney, Agent, or Firm* — Farjami & Farjami LLP

(57) ABSTRACT

The invention relates to a hydrodynamic machine, especially a hydrodynamic retarder, comprising two blade wheels which are opposite of one another in such a way that they jointly form a toroidal working chamber which can be filled with a working medium in order to hydrodynamically transfer torque by means of a cycle flow of the working medium in the working chamber from the first blade wheel to the second blade wheel, with the first blade wheel rotating about a rotation axis and the second blade wheel rotating about the same rotation axis in the same direction of rotation or opposite of the direction of rotation of the first blade wheel, or being held in a stationary manner. The invention is characterized in that at least one of the two blade wheels is subdivided in the region of its blades into at least two concentric rings.

21 Claims, 1 Drawing Sheet

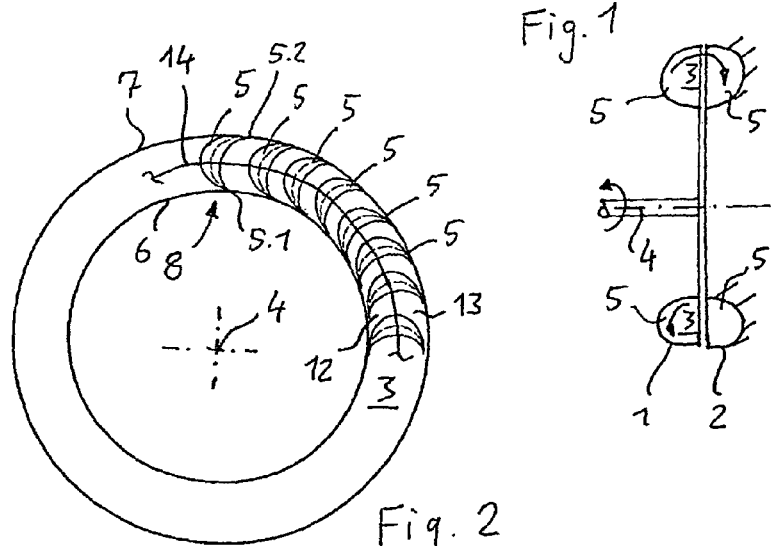
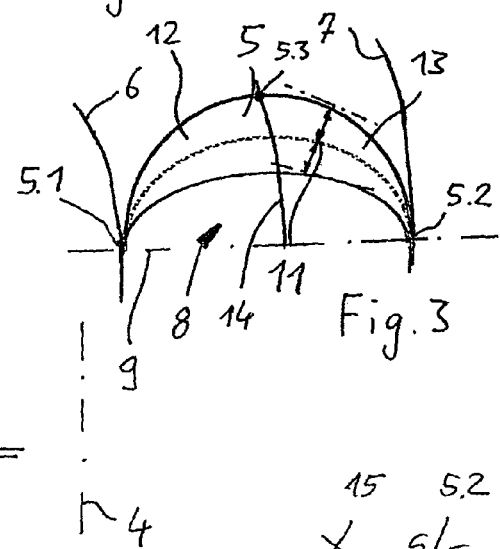
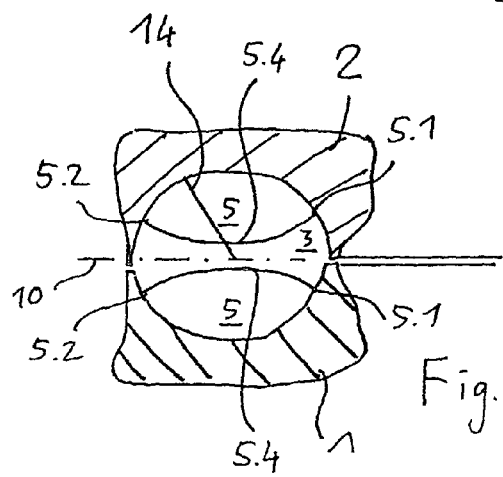
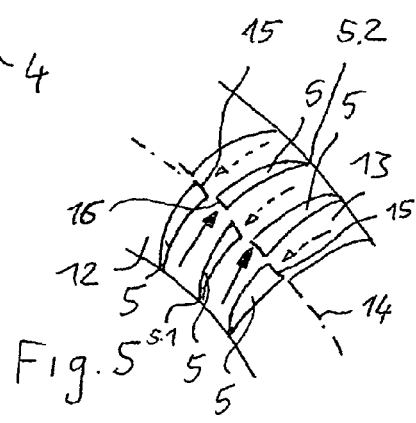

ic machine, especially a hydrodynamic retarder, in detail according to the preamble of claim 1.

HYDRODYNAMIC MACHINE, ESPECIALLY HYDRODYNAMIC RETARDER

This is a U.S. National phase application, which is based on and claims priority from foreign application Ser. No. 102010006333.9, filed on Jan. 29, 2010, in Germany.

The present invention relates to a hydrodynamic machine, especially a hydrodynamic retarder, in detail according to the preamble of claim 1.

Hydrodynamic machines comprise at least two bladed wheels which will be referred to below as blade wheels and which jointly form a toroidal working chamber. One distinguishes between such hydrodynamic machines which comprise precisely two blade wheels for forming the working chamber, namely hydrodynamic couplings and hydrodynamic retarders, and such hydrodynamic machines in which additionally fixed or fixable guide blade assemblies are provided in the working chamber, so-called hydrodynamic converters. The present invention relates especially to the former mentioned hydrodynamic machines with precisely two blade wheels, and especially to hydrodynamic retarders in which drive power or torque is transferred from a first revolving blade wheel to a second fixed blade wheel or from a first revolving blade wheel to a second blade wheel revolving in the opposite direction in relation to the first blade wheel in order to brake the first blade wheel.

It is important in vehicle drive trains in which the present invention is applicable that the hydrodynamic machines, especially a hydrodynamic retarder, has the lowest possible power loss, which is also designated as windage loss, in the deactivated state, which means in the state with the discharged working chamber. In order to avoid such windage losses, a number of solutions have been proposed such as the use of stator bolts or the possibility of evacuating the working chamber. A further solution for a retarder is described in the patent specification DE 44 46 287 C2, which is to subdivide the stator into at least two stator segments, of which one is stationary in respect of its position to the rotor blade wheel and the other can be deflected in relation to the rotor blade wheel. Various possibilities have been proposed for the deflection of segments, with one possibility that is not explained in closer detail providing that the stator segments are displaced in the circumferential direction or the tangential direction of the stator blade wheel.

The features known from the patent specification DE 44 46 287 C2 are summarised in the preamble of claim 1.

Reference is hereby made to the following documents concerning the further state-of-the-art:
DE 44 46 287 C2
US 5 147 181 A
DE 22 39 562 A
DE 195 44 190 B4
DE 38 11 246 A1
DE 87 14 859 U1
DE 1 475 389 A
DE 1 475 510 A
DE 1 075 384 A
DE 31 13 408 C1

Although various solutions have already been proposed in order to reduce the no-load losses (windage losses) of a hydrodynamic machine, especially a hydrodynamic retarder, any further reduction in the power loss is a decisive criterion for the acceptance of the use of such a hydrodynamic machine in the current period in which it is tried to further reduce power consumption of drive trains. This applies especially to vehicle retarders, because they are used for braking only in a fraction of the travelling time over the entire service life of the drive train and should rotate with the lowest possible losses in the remaining time "only" in idling operation.

It is the object of the present invention to provide a hydrodynamic machine, especially a hydrodynamic retarder, whose losses in idling operation are low and which simultaneously offers a high transferred moment in operation and cost-effective manufacturing.

This object in accordance with the invention is achieved by a hydrodynamic machine, especially a hydrodynamic retarder, which advantageously comprises precisely two blade wheels, with the features of claim 1. Advantageous and especially appropriate embodiments of the invention are provided in the dependent claims.

The hydrodynamic machine in accordance with the invention which is arranged especially as a hydrodynamic retarder comprises at least two blade wheels which are arranged opposite of one another in such a way that they jointly form a toroidal working chamber in which the blades of the blade wheels are positioned. The working chamber can be filled with a working medium or it can also be filled permanently according to one embodiment, in the case that the drive of the hydrodynamic machine can be switched off for deactivating the first blade wheel, in order to transfer torque by means of a cycle flow of the working medium in the working medium chamber in a hydrodynamic manner from the first blade wheel to the second blade wheel. As the person skilled in the art is well aware, the working medium is accelerated in the working chamber radially to the outside by the blades of the first blade wheel, enters the opposite second blade wheel, is delayed radially to the inside there and enters the first blade wheel radially to the inside again. As a result of this cycle transfer, the desired transfer of torque or drive power is performed.

In some hydrodynamic machines, especially those that are arranged as hydrodynamic converters, the blades can also be positioned in a manner that deviates from the arrangement in the working chamber as described above, so that the inlet or outlet of the cycle flow into or out of the blades of the first blade wheel and the second blade wheel can be disposed on a different diameter.

In accordance with the invention, at least the first blade wheel rotates about a rotation axis. In an embodiment as a hydrodynamic coupling or as a hydrodynamic converter, the second blade wheel rotates about the same rotation axis in the same direction of rotation as the first blade wheel. In the case of an embodiment as a hydrodynamic retarder, the second blade wheel is stationary or is driven from the outside against the direction of rotation of the first blade wheel about the same rotation axis in order to form a counter-rotating retarder.

At least one of the two blade wheels is subdivided in the region of its blades into at least two concentric rings and/or ring segments which can be twisted with respect to one another in the circumferential direction of the blade wheel in order to interrupt individual or all blades of the blade wheel in their surface progression by an offset optionally in a first state by relative twisting of the rings or ring segments with respect to one another, and to align the same in a second state into a common continuous surface. The first state is the braking operation in a hydrodynamic retarder, whereas the second state is the idle state or non-braking state.

In order to considerably improve the formation of an air circulation flow in the working chamber, the blades of at least the subdivided blade wheel in the state aligned into a common continuous surface or even the blades of the two blade wheels are arranged in an arc in a top view in the direction of the rotation axis to the respective blade wheel, which arc extends from a radially inner blade end on a radially inner wall of the working chamber to a radially outer blade end on a radially outer wall of the working chamber. It is achieved in this way that in the case of a relative twisting of the radially inner ring or ring segment in relation to the outer ring or ring segment (or vice-versa) the flow cross section for the medium still disposed in the working chamber, which is usually air and/or a residual quantity of working medium, will be blocked far more strongly in the circumferential direction between two adjacent blades or blade segments than before, thus achieving an especially strong disturbance of the flow. At the same time, the insertion of additional baffles or other elements can be avoided which are not involved in the transfer of torque in the activated operating state (braking operation) and which could achieve a similarly strong blocking of the flow cross section in the working chamber.

The arc in which the blades extend from their radially inner blade end to their radially outer blade end has the shape of a circular arc or a parabola in a top view in the direction of the rotation axis of the respective blade wheel. This shape of the circular arc or a parabola is thus obtained at least when seen from the separating gap onto each blade wheel. It is understood that other arc shapes are also possible and this description of the arc shape relates in the subdivided blade wheel to the state in which the concentric rings or ring segments are aligned with respect to one another in such a way that the individual blade segments which are formed by the subdivision of the blade wheel into rings or ring segments are aligned in such a way that they jointly produce the common continuous surface or surfaces on the sides of the blades facing away from one another.

Advantageously, the radially inner blade end and the radially outer blade end are positioned on a blade on a (theoretical) straight line which stands perpendicularly to the rotation axis and thus extends through the central point of the blade wheel.

In accordance with an advantageous embodiment, the blades are disposed perpendicularly to a plane which extends through the separating gap between the two blade wheels and extend in the direction of the rotation axis which stands perpendicularly to the mentioned plane through the separating gap. The shape of the arc is advantageous in which the blades extend from their radially inner blade end to their radially outer blade end, and/or the blade cross-section is substantially or completely identical through the blades in each axial section relating to the rotation axis of the hydrodynamic machine when the axial sections are drawn in that direction of the rotation axis behind one another and in parallel planes.

Since the blades have a certain blade thickness, the definition of the arc, over which the blades extend from their radially inner blade end to their radially outer blade end, can be chosen in various manners. The arc is formed by the central line of the blade according to a first definition assumed here. The central line of the blade is a theoretical line which on each of its points has an identical distance to the blade surfaces which extend on both sides of the central line of the blade and are arranged opposite of one another, relating to the radius of the central line of the blade. In other words, the central line of the blade is formed by each central point between two opposite tangents on the surfaces of the blades facing away from one another.

Another possible definition refers the arc to one of the two blade surfaces.

The two mentioned definitions are identical with respect to the arc-like progression of the blades when the blades have a constant blade thickness over the radius of the blade wheel. It is preferable however that the blades, especially originating from the region of their apex, which means their central point on one of their blade surfaces, taper in their cross-section towards the radially inner and radially outer blade end.

The front edges of the blades of the two blade wheels which face one another, which means the free axial ends of the blades which face one another in the direction of the rotation axis, advantageously have a convex bent shape, as seen in an axial sectional view along the rotation axis. It is understood that other shapes of arcs such as an S-shaped arc or a concave arc are possible for example.

In accordance with one embodiment, the blades of the first blade wheel and the blades of the second blade wheel have a profile which is identical with respect to each other. The number of the blades per blade wheel can differ from one another however. Furthermore, it is possible according to a first alternative that all blades of one and the same blade wheel have a blade profile which is identical with respect to one another. According to a second alternative, the blade wheels of one and the same blade wheel have profiles which differ from one another, but these different profiles can also be found in the other blade wheel in the described advantageous embodiment.

The invention will now be explained in closer detail by reference to a possible exemplary embodiment and by reference to the drawings, wherein:

FIG. 1 shows a schematic axial sectional view through a hydrodynamic retarder;

FIG. 2 shows a top view in the direction of the rotation axis on a blade wheel of the retarder according to FIG. 1;

FIG. 3 shows the arc shape of the blades of the top view according to FIG. 2 in an enlarged view;

FIG. 4 shows an enlarged schematic illustration in an axial sectional view through the toroidal working chamber with the progression of the front free blade ends (front end of blade);

FIG. 5 shows an enlarged schematic illustration of the two concentric rings of the blade wheel in the state when displaced relative to one another.

FIG. 1 shows a hydrodynamic retarder in a schematic illustration, comprising a revolving first blade wheel 1 and a stationary second blade wheel 2. The two blade wheels 1, 2 jointly form a toroidal working chamber 3, in which the blades 5 of the respective first blade wheel 1 and the second blade wheel 2 are positioned.

The blade wheel 1 rotates via the rotation axis 4, by means of which the working medium is accelerated radially to the outside and forms a cycle flow in the working chamber 3 (see the arrows in working chamber 3).

As is shown in FIG. 2, the blades 5 have the shape of an arc 8 in a top view in the direction of the rotation axis 4, which arc extends from a radially inner wall 6 of the working chamber 3 to a radially outer wall 7 of the working chamber 3. The radially inner blade end 5.1 rests on the radially inner wall 6, and the radially outer blade end 5.2 rests on the outer wall 7.

As is shown in FIG. 3 again on an enlarged scale, the arc 8 forms a circular arc. Another curved shape would also be possible, e.g. the shape of a parabola. Due to the fact that in the present case the cross-section of blade 5 tapers from the region of its apex 5.3 towards the radially inner blade end 5.1 and the radially outer blade end 5.2, the arc 8 is formed in its arc shape (shape of a parabola or any other shape) precisely through the central line 11 of the blade. The central line 11 of the blade has an identical distance to the blade surfaces arranged on either side of the same or to the tangents which extend on these surfaces, with the path of the shortest distance being perpendicular to these tangents, as shown with the illustrated arrows.

The radially inner blade end 5.1 and the radially outer blade end 5.2 are positioned on a straight line 9 which is perpendicular to the rotation axis 4 (not shown in FIG. 3).

As is shown in FIG. 4, the free axial ends 5.4 of the blades 5 which face one another in the axial direction of the hydrodynamic retarder have a convex arc shape, as seen in an axial sectional view along the rotation axis 4 and as shown in FIG. 4.

FIG. 4 further shows the plane 10 which extends through the separating gap between the two blade wheels 1, 2 and on which the blades 5 especially stand perpendicularly, at least in the region of their free axial end or over their entire axial extension.

Although the arc 8 of each blade 5 extends in the illustrated embodiment over 180°, larger or smaller lengths of the arc can generally be considered, especially in a range of between 120° to <180° or >180° to 195°.

In order to securely prevent the formation of a cycle flow of air for example or residues of working medium remaining despite discharging in the non-operating state or in idling operation in which the working chamber 3 has been discharged from working medium and optionally has even been evacuated, at least one of the two illustrated blade wheels 1, 2, which in this case is the blade wheel shown in FIG. 2, has been subdivided into two rings which are arranged concentrically with respect to one another with reference to the rotation axis 4, which rings are full rings in this case. In the present case, precisely 2 rings are provided, which are the radially inner ring 12 and the radially outer ring 13 (cf. the separating gap 14 between the two rings 12, 13).

In the present case, the separating gap 14 extends, as seen in the radial direction, in the middle of the working chamber 3, i.e. at the front axial end 5.4 of the blades 5 on a middle diameter which has the same distance to the radially outer wall 7 and to the radially inner wall 6 of the working chamber 3 and/or to the radially inner blade end 5.1 and to the radially outer blade end 5.2. The separating gap 14 can extend parallel to the rotation axis 4 along the rotation axis 4 in an axial sectional view through the blade wheel, or also inclined thereto, as shown in FIG. 4. In addition to a straight progression in the mentioned axial sectional view, it would also be possible to provide a curved progression or a bent or zigzag progression of the separating gap 14.

Whereas FIGS. 2 and 3 show the state of the blade wheel in the activated operating state of the hydrodynamic machine with a working chamber 3 which is filled with working medium (which is the braking operation in the retarder) in which the two concentric rings 12, 13 are aligned with respect to one another in such a way that the segments forming the blades 5 jointly form two continuous surfaces of each blade 5 on opposite sides, FIG. 5 shows the twisted state of the rings 12, 13 in which the blade surfaces are interrupted, which occurs by displacement of the radially inner ring 12 in the circumferential direction relative to the radially outer ring 13 or by displacement of the radially outer ring 13 relative to the radially inner ring 12 or by simultaneous displacement of both rings 12, 13. As is shown, not only the surface on each side of each blade 5 is interrupted by the displacement by an offset in its progression from radially inside to radially outside or from the radially inner blade end 5.1 to the radially outer blade end 5.2, but the face surface of the blades 5 which extends along the separating gap 14 blocks a forming cycle flow and blocks the flow channel. When the first blade wheel is arranged to be subdivided accordingly into rings 12, 13 or ring segments, the face surface 16 of the blades 5 of the radially outer ring 13 opposes the flow (see arrows with the continuous line). If on the other hand the second blade wheel, especially the stator of a retarder; is arranged in a respectively subdivided manner, the face surface 15 of the radially inner ring 12 opposes a cycle flow and blocks the flow channel (see arrows with the broken line). As a result, in the presently chosen designation the face surface 15 faces radially to the outside and opposes a flow facing radially to the inside, whereas the face surface 16 faces radially to the inside and opposes a flow radially to the outside.

As a result of the present illustrated embodiment with blades 5 which taper from their apex 5.3 in their cross-section in the direction of the radial ends 5.1 and 5.2, with the separating gap 14 extending close to or precisely through the apex 5.3, the mentioned surfaces 15 and 16 have a considerable width in the circumferential direction of the blade wheel. The blocking effect of this width is amplified by the adjacent arc shape of the blades 5, which further leads to the consequence that the blades 5 also extend in the circumferential direction.

Although the invention was illustrated by means of an embodiment with two rings that can be twisted relative to one another, it is also possible to provide an embodiment with three, four or more rings which are arranged concentrically with respect to one another and which are arranged behind one another in the radial direction or enclose one another in the circumferential direction. A subdivision into ring segments is also possible.

Furthermore, subordinate ideas of the present invention provide that the mutually facing front edges of the blades are beveled on one side or both sides, so that the tips face one another. It is also possible to consider "obtuse" front edges of the blades or straight front edges of the blades, with the latter having rounded corners in particular. Front edges of the blades which are rounded off entirely are also possible. The measures can be considered in both opposing blades or in only one blade.

The two halves of the working chamber formed by the blade wheels need not necessarily lie on the same identical diameter, but an offset can also be considered. This means that the blades of the one blade wheel can lie on a slightly larger diameter than the blades of the other blade wheel.

The mutually facing free axial ends of the blades can also be straight or have a concave arc shape, thus deviating from the illustration in FIG. 4. The other oppositely facing free axial ends also need not be identical with respect to one another. For example, a concave arc shape can be combined with a convex arc shape, or a concave or convex arc shape with a straight front edge of the blade.

The invention can be used especially advantageously in a hydrodynamic machine with profile displacement, which means for example in working chambers whose ratio of inner diameter and outer diameter (inner diameter divided by outer diameter) is especially large, especially larger than in a so-called nominal profile or normal profile. An especially large number of blades can thus be achieved.

The invention can further be applied to so-called double cycles, which means in hydrodynamic machines with two (or more) working chambers in which accordingly two (or more) working medium cycles are formed, especially parallel with respect to one another concerning their transfer effect. It is especially advantageous in a hydrodynamic retarder when the stator is formed by the twistable concentric rings or comprises such rings. In a so-called back-to-back arrangement the stator can be positioned inwardly, enclosed between two rotors or rotor parts, or on the outside, enclosing a rotor between its two parts.

The invention claimed is:

1. A hydrodynamic machine comprising:
a first blade wheel and a second blade wheel positioned opposite of one another and jointly forming a toroidal working chamber fillable with a working medium to hydrodynamically transfer torque using a cycle flow of the working medium in the working chamber from the first blade wheel to the second blade wheel;
wherein the first blade wheel rotates about a rotation axis in a first direction;
wherein the second blade wheel is stationary or rotates about the rotation axis in the first direction or opposite of the first direction;
wherein at least one of the first blade wheel and the second blade wheel is subdivided in a blade region into one or more of at least two concentric rings and ring segments configured to be twisted with respect to one another in a circumferential direction of the at least one of the first blade wheel and the second blade wheel to interrupt one or more blades of the at least one of the first blade wheel and the second blade wheel in surface progression (a) in a first state by an offset as a result of relative twisting of the one or more of at least two concentric rings and ring segments with respect to one another, or (b) in a second state by aligning the one or more of at least two concentric rings and ring segments into a common continuous surface;
wherein at least the one or more blades of the at least one of the first blade wheel and the second blade wheel have an arc shape.

2. The hydrodynamic machine according to claim 1, wherein the arc shape is circular.

3. The hydrodynamic machine according to claim 2, wherein a radially inner blade end and a radially outer blade end of the one or more blades are positioned on a straight line in the second state, and wherein the straight line stands perpendicularly to the rotation axis.

4. The hydrodynamic machine according to claim 3, wherein the one or more blades stand perpendicularly to a plane forming a separating gap between the first blade wheel and the second blade wheel.

5. The hydrodynamic machine according to claim 3, wherein the arc shape is formed by a central line of each of the one or more blades extending through each central point between two opposite tangents on surfaces of each of the one or more blades facing away from one another, and each of the one or more blades taper in a cross section starting from a region of apex to a radially inner and a radially outer blade end.

6. The hydrodynamic machine according to claim 2, wherein the one or more blades stand perpendicularly to a plane forming a separating gap between the first blade wheel and the second blade wheel.

7. The hydrodynamic machine according to claim 2, wherein the arc shape is formed by a central line of each of the one or more blades extending through each central point between two opposite tangents on surfaces of each of the one or more blades facing away from one another, and each of the one or more blades taper in a cross section starting from a region of apex to a radially inner and a radially outer blade end.

8. The hydrodynamic machine according to claim 1, wherein the arc shape is parabola.

9. The hydrodynamic machine according to claim 8, wherein a radially inner blade end and a radially outer blade end of the one or more blades are positioned on a straight line in the second state, which and wherein the straight line stands perpendicularly to the rotation axis.

10. The hydrodynamic machine according to claim 9, wherein the one or more blades stand perpendicularly to a plane forming a separating gap between the first blade wheel and the second blade wheel.

11. The hydrodynamic machine according to claim 9, wherein the arc shape is formed by a central line of each of the one or more blades extending through each central point between two opposite tangents on surfaces of each of the one or more blades facing away from one another, and each of the one or more blades taper in a cross section starting from a region of apex to a radially inner and a radially outer blade end.

12. The hydrodynamic machine according to claim 8, wherein the one or more blades stand perpendicularly to a plane forming a separating gap between the first blade wheel and the second blade wheel.

13. The hydrodynamic machine according to claim 8, wherein the arc shape is formed by a central line of each of the one or more blades extending through each central point between two opposite tangents on surfaces of each of the one or more blades facing away from one another, and each of the one or more blades taper in a cross section starting from a region of apex to a radially inner and a radially outer blade end.

14. The hydrodynamic machine according to claim 1, wherein a radially inner blade end and a radially outer blade end of the one or more blades are positioned on a straight line in the second state, and wherein the straight line stands perpendicularly to the rotation axis.

15. The hydrodynamic machine according to claim 14, wherein the one or more blades stand perpendicularly to a plane forming a separating gap between the first blade wheel and the second blade wheel.

16. The hydrodynamic machine according to claim 14, wherein the arc shape is formed by a central line of each of the one or more blades extending through each central point between two opposite tangents on surfaces of each of the one or more blades facing away from one another, and each of the one or more blades taper in a cross section starting from a region of apex to a radially inner and a radially outer blade end.

17. The hydrodynamic machine according to claim 1, wherein the one or more blades stand perpendicularly to a plane forming a separating gap between the first blade wheel and the second blade wheel.

18. The hydrodynamic machine according to claim 1, wherein the arc shape is formed by a central line of each of the one or more blades extending through each central point between two opposite tangents on surfaces of each of the one or more blades facing away from one another, and each of the one or more blades taper in a cross section starting from a region of apex to a radially inner and a radially outer blade end.

19. The hydrodynamic machine according to claim 1, wherein free axial ends of each of the one or more blades of the at least one of the first blade wheel and the second blade wheel have a convex arc shape.

20. The hydrodynamic machine according to claim 1, wherein a separating gap between the at least two concentric rings and ring segments extends in an oblique manner relative to the rotation axis.

21. The hydrodynamic machine according to claim 1, wherein the hydrodynamic machine includes a hydrodynamic retarder.

* * * * *